United States Patent [19]

Buddemeyer et al.

[11] 3,762,932
[45] Oct. 2, 1973

[54] BAKERY PRODUCTS CONTAINING EMULSIFICATION AND IMPROVING AGENTS

[75] Inventors: Bruce D. Buddemeyer, Overland Park, Kans.; John R. Moneymaker, Kansas City, Mo.

[73] Assignee: The Paniplus Company, Kansas City, Mo.

[22] Filed: June 21, 1967

[21] Appl. No.: 647,877

Related U.S. Application Data

[63] Continuation of Ser. No. 379,341, June 30, 1964, abandoned.

[52] U.S. Cl. ............................ 99/92, 99/91, 99/94, 99/134, 99/136, 99/139, 252/351
[51] Int. Cl. ............................................. A21d 13/08
[58] Field of Search.......................... 99/94, 118, 92

[56] References Cited
UNITED STATES PATENTS 2,689,797  9/1954  Joffe ........................................ 99/91
2,874,175  2/1959  Feuge et al. ........................ 99/118 X
2,973,270  2/1961  Thompson et al. .................... 99/123
3,034,898  5/1962  Kuhrt et al. ............................. 99/91
3,360,375  12/1967  Buddemeyer et al. .................. 99/81
3,343,964  9/1967  Thomas ................................... 99/80

Primary Examiner—Raymond N. Jones
Attorney—James B. Raden et al.

[57] ABSTRACT

Bakery products having incorporated therein an emulsification agent which consist of in combination (1) a non-toxic mono aliphatic ester of a dicarboxylic acid, and (2) a composition comprising a member selected from the group consisting of mono-fatty acid esters of aliphatic polyhydric alcohol compounds, di-fatty acid esters of aliphatic polyhydric alcohol compounds, fatty acid esters of citric and lactic acids, and mixtures thereof.

8 Claims, No Drawings

BAKERY PRODUCTS CONTAINING EMULSIFICATION AND IMPROVING AGENTS

This is a continuation of U.S. Pat application Ser. No. 379,341 filed June 30, 1964 and now abandoned.

This invention relates to novel addition agents which have been found to possess unique properties as emulsification and improving agents in a variety of products, including food, cosmetic and pharmaceutical preparations.

An object of this invention is to provide new and improved agents of a lipoidal nature, which, when included as ingredients in the products of the type described, considerably improve the properties and usefulness of such products, and also improve and facilitate the processing and manufacture of such products.

Another object of the invention is to provide novel compositions of matter of a relatively innocuous nature for improving the properties and usefulness of bakery products, including bread, sweet doughs, cake, cookies, icings, fillings, fondants, and cremes, and the like.

Another object of the invention is to provide novel compositions of matter for improving the properties and usefulness of dairy products, such as ice cream, ice milk and mellorines.

Another object of this invention is to provide novel compositions of matter of a lipoidal nature for addition to food products or other systems containing protein, starch and/or fats to improve the properties and usefulness thereof.

A specific object of this invention is to provide agents of a lipoidal nature for improving the properties of baked leavened dough products.

An additional object of this invention is to provide improved shortening compositions for bakery and food products.

Still a further object of this invention is to provide new and useful agents of a lipoidal nature for improving the manufacturing of and the properties of cosmetic and pharmaceutical preparations.

Other objects will in part be obvious and will in part be made clear from the following description.

These and other objects are attained by the utilization in products of the type described of relatively small but effective amounts of an additive which comprises, in combination: (1) certain long chain alkyl mono-esters of dicarboxylic acids, and/or salts of such esters; and (2) certain fatty acid esters of hydroxy compounds, including polyols and hydroxy carboxylic acids.

For reasons of clarity, each of the ingredients making up the combined additives of this invention will be discussed separately.

THE LONG CHAIN ALKYL MONO-ESTERS OF DICARBOXYLIC ACIDS

One component of the combined additive of this invention is a long chain alkyl mono-ester of a dicarboxylic acid.

Especially suitable and preferred for use are the monoalkyl esters, including the salts of such esters, resulting from the reaction of a fatty alcohol having 12 to 24 carbon atoms, including mixtures thereof, and a dicarboxylic acid compound having up to and including 10 carbon atoms. Included within the dicarboxylic acid compounds that may be used are succinic, glutaric, adipic, fumaric, maleic, malic, azelaic, and sebacic acids, acyl halides (e.g., bromides, chlorides, iodides, fluorides) of the foregoing acids, anhydrides of the foregoing acids, and mixtures of the foregoing.

As will be made clear hereinbelow, the alkyl substituent which is generally preferred is derived from saturated fatty alcohols corresponding to the formula $C_nH_{2n+1}OH$, wherein $n$ is an integer from 12 to 24, including mixtures thereof. However, alcohols corresponding to the formulae: $C_nH_{2n-1}OH$, $C_nH_{2n-3}OH$ and $C_nH_{2n-5}OH$, wherein $n$ is an integer from 12 to 24, including mixtures thereof, have also been found to have utility in providing the alkyl substituents of the novel esters herein described, and may be used.

The mono-esters may readily be prepared by reacting such fatty alcohols with the described dicarboxylic acids, per se, or with the anhydrides or acid halides of the dicarboxylic acids. Depending upon the reactants, a solvent or solvent system may be used to facilitate intimate contact and improve reactivity of the reactant materials.

The following reaction between stearyl alcohol and adipic acid is typical of the reaction mechanism involved in forming the fatty alcohol mono-esters of dicarboxylic acids suitable for use herein.

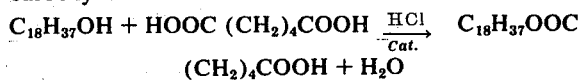

$$C_{18}H_{37}OH + HOOC(CH_2)_4COOH \xrightarrow[Cat.]{HCl} C_{18}H_{37}OOC(CH_2)_4COOH + H_2O$$

It will be clear from the foregoing description that the mono-esters generally correspond to the formula R'OOCRCOOZ, wherein R' is an aliphatic hydrocarbon substituent containing 12 to 24 carbon atoms and derived from a saturated or unsaturated alcohol; R is an aliphatic hydrocarbon group having up to and including 8 carbon atoms; and Z is a cation, e.g., hydrogen, when the compound is in the form of the free acid, and a metal when the compound is in the form of a metal salt.

R may be saturated or unsaturated, substituted (e.g., hydroxyalkyl) or unsubstituted. R may also contain an even or odd number of carbon atoms.

The mono-esters may be used in either the free acid or the salt form. Among the salts may be mentioned the alkali metal salts, such as sodium and potassium, the alkaline earth metal salts, such as calcium and magnesium, and the ammonium and aluminum salts. The alkali metal salts constitute preferred embodiments of the esters.

The acid form of the mono-esters may be converted to the ester salts by reaction in a well known manner with a hydroxide, e.g., NaOH, KOH, or salt, e.g., $CaCO_3$, of a metal whose ester salt is desired.

The following examples are illustrative of the manner in which component 1 of the additives of the present invention can be synthesized.

EXAMPLE 1

Preparation of a Mono Alkyl Ester of Succinic Acid

A five liter reaction flask, equipped with a mechanical stirrer, thermometer, and pressure release valve, was charged with 6.7 moles (670.6 gms.) of commercial food grade succinic anhydride, molecular weight 100.1. The anhydride was melted by means of a heating mantle surrounding the flask and warmed to 130° C. with continuous stirring. Then, 6.1 moles (1,607.4 gms.) of a commercial food grade saturated fatty alcohol (average molecular weight 263.5; approximate composition - 1 percent $C_{12}$; 4 percent $C_{14}$; 32 percent $C_{16}$; 62 percent $C_{18}$; 1 percent $C_{20}$) was heated to melting temperature and then gradually introduced into the succinic anhydride flask over a 45 minute period, as the temperature of the reactants in the flask was increased to 150° C. After completing the addition of the fatty alcohol composition, the reaction mass was held at 150° C. with continuous stirring for 60 minutes. The product was then transferred warm to a 4 liter beaker and washed twice at 90° C. with 2 liters of saturated sodium chloride solution and finally with warm distilled water. The washed sample was allowed to solidify and then transferred to a vacuum dessicator. Under a vacuum of approximately 10 mm. Hg, the product was gradually melted by application of heat from an infrared lamp, thus effecting drying. The resultant product was a light, cream colored, soft, waxy solid at room temperature, having an acid value of 154, a saponification value of 312, and a melting point range of 63°–64° C.

The following tabulation sets down the theoretical acid and saponification values and the range of values obtained from the analysis of compounds resulting from a number of syntheses.

|  | Theoretical | Actual |
|---|---|---|
| Acid Value | 154.3 | 154–162.4 |
| Saponification Value | 308.6 | 298.7–312 |

Substantially all of the reaction product is comprised of the compound R'OOCCH$_2$CH$_2$COOH, wherein R' is the saturated alkyl group of the commercial fatty alcohol employed.

EXAMPLE 2

Preparation of a Mono Cetyl Ester of Glutaric Acid

A 1 liter three-necked reaction flask, fitted with a stirrer, thermometer and pressure relief valve, was charged with 1.95 moles (222.5 gms.) of commercial glutaric anhydride, molecular weight 114.1, and warmed to 100° C. by a heating mantle. Then 1.3 moles (315.2 gms.) of practical grade 1-hexadecanol (cetyl alcohol) molecular weight 242.5, was melted and gradually introduced into the reaction flask during a 30 minute period with constant agitation. The reaction was continued for 3 hours at a temperature of 100°–110° C. The warm liquid reaction product was washed twice with hot water and then allowed to solidify. The product was dried by melting under vacuum in a dessicator equipped with an infrared heating lamp. The resultant product was a waxy solid with an acid value of 156, saponification value 306, and melting point range of 66°–67° C.

The following tabulation sets down the theoretical acid and saponification values and the range of values obtained from the analysis of compounds resulting from a number of preparations as described above.

|  | Theoretical | Actual |
|---|---|---|
| Acid Value | 157.3 | 151.5–155.7 |
| Saponification Value | 314.6 | 306–309 |

The variations observed are to a large extent due to the purity of the reagents employed in the syntheses.

Substantially all of the reaction product is comprised of the compound corresponding to the formula:

C$_{16}$H$_{33}$OOCCH$_2$CH$_2$CH$_2$COOH.

EXAMPLE 3

Preparation of a Mono Alkyl Ester of Adipic Acid 526.1 grams (3.6 moles) of commercial adipic acid, molecular weight 146.14, was weighed into a 3 liter reaction flask fitted with a mechanical stirrer, thermometer, and insulated dropping funnel. The adipic acid was warmed by means of a heating mantle controlled by a powerstat to 155° C. A fatty alcohol mixture (molecular weight 263.5) conforming the following approximate composition:

| Lauryl alcohol | 1% |
|---|---|
| Myristyl alcohol | 4% |
| Cetyl alcohol | 32% |
| Stearyl alcohol | 62% |
| Arichidyl alcohol | 1% | was simultaneously warmed to 55° C. and introduced into an insulated dropping funnel. 790.5 grams (3.0 moles) of the fatty alcohol composition was employed. After melting the adipic acid, a catalytic amount (0.6 mls.) of hydrochloric acid was added thereto, and with stirring, the addition of the fatty alcohol composition was initiated. The addition required approximately 1 hour. Following the addition of the fatty alcohol, the reactor was modified by removing the dropping funnel and inserting a goose-neck and distillation condenser with graduated receiver. A vacuum line was connected to the receiver. Under a vaccum of approximately 22 inches, the reactants were warmed at a temperature of 165° C. for 5 hours. 95 percent of the theoretical water of esterification was removed during this period.

The product was washed twice with saturated salt water at melt, then placed in a 90° C. moisture oven for 2 hours. Residual salt settled to the bottom of the flask and the clear liquid product was decanted off. Moisture of the final product was found to be 0.3 per cent.

The reaction product was a very light creamed color waxy solid. This material had an acid number of 115, a saponification number of 247, and a melting point of 51.5° C. Based on these values, approximately an 83 per cent yield of the monoalkyl adipic acid was obtained.

The reaction product corresponds to the formula:

R'OOC(CH$_2$)$_4$COOH, wherein R' corresponds to the alkyl substituents of the commercial fatty alcohol employed.

EXAMPLE 4

Preparation of a Mono Alkyl Ester of Fumaric Acid

A 5 liter three-neck round bottom reaction flask was fitted with a mechanical stirrer, thermometer and insulated dropping funnel and attached to a hydrogen chloride generator. The reactor was charged with 755.06 gms. (7.7 moles) of maleic anhydride and warmed to 100° C., using a heating mantle controlled by a Powerstat. With constant stirring, 1,844.5 gms. (7.0 moles) of a fatty alcohol composition primarily composed of cetyl and stearyl alcohols as described in Example 3 above was introduced gradually into the reaction flask during a period of 30 minutes. Dry hydrogen chloride gas was bubbled into the reaction mixture during and subsequent to the addition of the alcohol. The reaction temperature was increased to 125° C. in the initial 10 minutes. The 125° C. temperature was maintained and hydrogen chloride gas addition was continued with constant stirring for 60 minutes following completion of the alcohol addition. The reaction product was then allowed to cool and stand at room temperature in the flask overnight.

The reaction product was re-melted and washed twice at 90° C. with 2 liter aliquots of saturated sodium chloride solution and then vacuum dried.

The resultant product was a cream colored hard, waxy solid at room temperature having the following physical and chemical properties:

|  | Theoretical | Actual |
|---|---|---|
| Acid Number | 155.1 | 145.1 |
| Saponification Number | 310.2 | 297.3 |
| Melting Point |  | 80°–81° C. |

Polarographic analysis of samples subjected to mild saponification, a treatment which is known not to isomerize maleic acid to fumaric acid, substantiated that a substantially complete conversion of maleic anhydride (cis) to the fumarate ester (trans) was accomplished.

Thus, the reaction product corresponded substantially completely to the formula:

R'OOCCHCHCOOH (trans)

wherein R' corresponds to the alkyl substituents of the commercial fatty alcohol employed.

EXAMPLE 5

Synthesis of a Mono Alkyl Ester of Malic Acid

A 500 milliliter, three-neck reaction flask was adapted with a mechanical stirrer, reflux condenser and centigrade thermometer. The flask was charged with 50 mls. of 1–4 dioxane and 1 ml. of concentrated hydrochloric acid. This mixture was warmed to 60° C. and 134.1 gms. (1.0 moles) of malic acid, molecular weight 134.1, was introduced over a 15 minute period with constant stirring. Then, 131.75 gms. (0.5 moles) of a stearylcetyl alcohol mixture, molecular weight 263.5, as described in Example 3 above was added to the reaction flask over a period of 15 minutes with increasing temperature. The contents of the flask was then refluxed for 2 hours at approximately 95° C. Following reflux, the reaction mixture was removed to a beaker and the product was allowed to solidify over the dioxane solvent. The cake was removed from the beaker, warmed to melt and transferred to a separatory funnel. At melt, the reaction product was washed twice with 85° C. saturated salt water. After the second wash, an emulsion was formed which was dissolved in ether in a warm water bath. Finally the ether was evaporated and the compound was allowed to solidify. The resultant cake was dried by melting in a vaccum dessicator equipped with infrared heat. The resultant product was a white, hard, waxy solid having the following chemical and physical properties:

|  | Theoretical | Actual |
|---|---|---|
| Saponification Number | 296 | 235.6 |
| Melting Point |  | 48°–49° C. |

It corresponded to the formula:

R'OOCCHOHCH$_2$COOH, wherein R' corresponds to the alkyl substituents of the commercial fatty alcohol employed.

EXAMPLE 6

Preparation of the Sodium Salt of a Monocetyl Ester of Glutaric Acid

One hundred grams of the monocetyl glutaric acid of Example 2, molecular weight 356.56, were melted in a tall form, 500 ml. beaker in a hot water bath. 14.5 gms. of sodium carbonate, molecular weight 105.99, were added slowly with constant stirring. The neutralization reaction, as indicated by foaming, continued for approximately 20 minutes. The material was then dried under vacuum in a dessicator using infrared heat. Several hours were required to remove the water of neutralization. In drying, the temperature of the material reached 225° C. The final product, when cooled, was hard and brittle with a light tan color, and dispersible in water. The material was easily pulverized using a mortar and pestle. It had the following chemical and physical characteristics:

|  | Theoretical | Actual |
|---|---|---|
| Acid Number | 0 | 0.5 |
| Saponification Number | 148.2 | 150.15 |
| Melting Point |  | 150° C. |

The product corresponded to the formula:

C$_{16}$H$_{33}$OOCCH$_2$CH$_2$CH$_2$COONa.

EXAMPLE 7

Preparation of a Mono Alkyl Ester of Azelaic Acid

A one liter, three-neck reaction flask was equipped with a mechanical stirrer, graduated dropping funnel, thermometer and water condenser. 228 gms. (1.2 moles) of azelaic acid (average molecular weight 190.2, melting point range 96°–101° C., 85 per cent pure containing 9 per cent dibasic acids less than 9 carbons and 6 per cent greater than 9 carbons) was introduced and the acid was brought to a temperature of 150° C. by means of a heating mantle controlled by a variable rheostat. One milliliter of concentrated hydrochloric acid was pipetted into the flask and then 263.5 gms. (1 mole) of a stearyl cetyl alcohol composition (approximate composition 1 percent C$_{12}$, 4 percent C$_{14}$, 32 percent C$_{16}$, 62 percent C$_{18}$ and 1 percent C$_{20}$) was added drop-wise at melt over a period of 3 hours. During this time interval, approximately one-half of the theoretical water of esterification was collected. Heating at 150° C. with continuous stirring was continued for an additional 5 hours and 15 minutes at which time the total theoretical water of esterification was recovered. The product was then washed at 85° C. with 500 milliliters of distilled water and then dried, employing about 10 mm. mercury vacuum and heat from an infrared lamp.

The resultant product was a buff colored, hard, waxy solid at room temperature, having the following physical and chemical properties:

|  | Theoretical | Actual |
|---|---|---|
| Acid Number | 128.8 | 114.8 |
| Saponification Number | 257.6 | 245.5 |
| Melting Point Range |  | 49.5°–51.0° C. |

It corresponded to the formula:

R'OOC — (CH$_2$)$_7$ — COOH, wherein R' corresponds to the alkyl substituents of the commercial fatty alcohol employed.

EXAMPLE 8

Preparation of a Mono Alkyl Ester of Sebacic Acid

The apparatus and procedure described in Example 7 was employed with slight modification for the preparation of the monofatty alcohol derivative of sebacic acid. The reaction flask was charged with 242.6 gms. (1.2 moles) of CP grade sebacic acid. On warming to 200° C., 263.5 gms. (1.0 moles) of a stearyl-cetyl alcohol composition as described in Example 3 was added over a period of 55 minutes. Hydrochloric acid was not employed as a catalyst in this reaction. Heating with continuous stirring at 200° C. was continued for 30 minutes after the alcohol addition was complete. Following this time period, the theoretical water of esterification was recovered.

The resultant product was washed twice with one liter of distilled water and vacuum dried with the aid of an infrared heating lamp. The final product was a light cream colored, hard, brittle solid at room temperature, having the following physical and chemical properties:

|  | Theoretical | Actual |
|---|---|---|
| Acid Number | 125.3 | 119.0 |
| Saponification Number | 250.6 | 237.0 |
| Melting Point Range |  | 66°–68° C. |

It corresponded to the formula:

$$R'OOC(CH_2)_8COOH,$$

wherein R' corresponds to the alkyl substituents of the commercial fatty alcohol employed.

EXAMPLE 9

Preparation of a Mono Oleyl Ester of Fumaric Acid

A reaction flask was charged with 107.8 gms. (1.1 moles) of maleic anhydride and warmed to 125° C. with stirring. Then 268.0 gms. (1.0 moles) of oleyl alcohol (approximate composition: unsaturated: $C_{18}$— 85 percent; $C_{16}$— 4 percent; $C_{18}$ [linoleyl] — 6 percent; saturated: $C_{14}$— 1 percent; $C_{16}$— 2 percent; $C_{18}$— 1 percent; $C_{20}$ — 2 percent) was introduced slowly into the reaction flask during a period of 30 minutes. The reaction mixture was stirred constantly and dry hydrogen chloride gas was bubbled through the reactants to insure complete conversion of the maleic (cis) to the fumaric (trans) ester. Following the addition of the alcohol, the temperature of the reactants was maintained at 125° C. with stirring and in the presence of dry hydrogen chloride for a period of 60 minutes. The resultant product was washed at 50° C. with four aliquots of salt water and finally dried under vacuum.

The resultant product was a dark cream colored, soft, plastic solid at room temperature, having the following chemical and physical characteristics:

|  | Theoretical | Actual |
|---|---|---|
| Acid Number | 153.3 | 148.7 |
| Saponification Number | 306.3 | 291.7 |
| Melting Point Range |  | 41°–43° C. |

It corresponded to the formula:

$$C_{18}H_{35}OOCCHCHCOOH \text{ (trans)}.$$

EXAMPLE 10

Preparation of Mono Oleyl Ester of Succinic Acid

A 500 milliliter, three-neck reaction flask was fitted with mechanical stirrer, centigrade thermometer and pressure relief valve and charged with 110.1 gms. (1.1 moles) of succinic anhydride, molecular weight 100.1. The succinic anhydride was melted in the flask and the temperature was raised to 130° C. Then, 267.5 gms. (1.0 moles) of oleyl alcohol, molecular weight 267.5, 77 per cent unsaturated, was warmed and added to the melted succinic anhydride with gradually increasing temperature. Following the addition of the oleyl alcohol, the temperature was increased to 150° C., and the reaction was continued for 1 hour.

The resultant product was washed twice with 85° C. salt water and dried in a vacuum oven at 60° to 70° C. The product was a clear amber liquid at room temperature with the following chemical and physical characteristics:

|  | Theoretical | Actual |
|---|---|---|
| Acid Number | 152.6 | 154.3 |
| Saponification Number | 305.2 | 294.5 |
| Melting Point Range |  | 19°–20° C. |

It corresponded substantially to the formula:

$$C_{18}H_{35}OOCCH_2CH_2COOH.$$

It will be understood by those skilled in the art that the formulae given in Examples 1 to 10 represent only the major mono-ester component of the reaction product. For instance, in Examples 9 and 10, the mono-esters with alkyl substituents other than oleyl ($C_{18}H_{35}$-) are present because of the nature of the alcohol used as a starting material.

It will further be clear from Examples 1 to 10 that in making the mono-esters, the dicarboxylic acid compound is employed in stoichiometric amount, and usually in excess of stoichiometric amount, based on the alcohol.

The Mono-Fatty Acid Esters of Hydroxy Compounds

The second ingredient making up the combination additives of this invention are selected from the group consisting of mono- and/or di-fatty acid esters of aliphatic polyhydric alcohols, fatty acid esters of hydroxy carboxylic acids, and mixtures of the foregoing.

The fatty acid esters of hydroxy carboxylic acid compounds are prepared by reaction of fatty acids of the type described supra, or acyl derivatives thereof, with hydroxy carboxylic acids or suitable acyl derivatives thereof.

Suitable hydroxy carboxylic acids include citric and lactic acids, including acyl derivatives thereof.

The preferred embodiment of fatty acid esters of hydroxy carboxylic acid compounds for use herein are the fatty acid esters of lactic acid formed by reaction between a fatty acyl compound with lactic acid or a suitable acyl derivative of lactic acid. Hereinafter these esters will be referred to as acyl lactylic acid compounds.

Suitable acyl lactylic acid compounds correspond to the formula:

$$RCO(OCHCH_3CO)_nOZ$$

wherein RCO is a member selected from the group consisting of acyl radicals of fatty acids containing 12 to 24 carbon atoms, and mixtures thereof, Z is a cation and n is a number which represents the average number of lactyl, i.e., ($OCHCH_3CO$), groups present per molecule. The value of n may vary from about 0.1 to 10.0 and is preferably between about 0.3 and 6.0. Best results are achieved with acyl lactylic acid compositions having a value for n of less than 1, or between about 0.3 and 0.9, and such materials are preferred for use.

The cation Z in the above formula may be selected from the group consisting of hydrogen, when the material is in the acid form, and alkali metals, alkaline earth metals, ammonia and aluminum, when the material is in the salt form. Among the preferred alkali metal cations may be mentioned sodium and potassium. The preferred alkaline earth metals include calcium and magnesium.

The acyl lactylates are prepared by reaction of fatty acids of the type described or derivatives thereof and lactic acid or its derivatives.

The method of making acyl lactylic acid compounds with n values greater than 1 is well understood in the art, suitable methods being disclosed, for example, in U.S. Pat. Nos. 2,793,270 and 2,733,252.

The acyl lactylic acid compositions with n values less than 1 are recent in origin, and are disclosed in our co-pending U.S. Pat. application Ser. No. 162,927, filed Dec. 28, 1961, now U.S. Pat. No. 3,141,030.

Also suitable as the second component of the addition agents of this invention are mono- and/or di-fatty acid esters of aliphatic polyhydric alcohols, or derivatives thereof, which may be characterized, in whole or in part, as the reaction products of mono-fatty acyl compounds containing 12 to 24 carbon atoms, or mixtures thereof, with aliphatic polyhydric alcohols or derivatives thereof, containing at least two or between about two and 10 hydroxyl groups in the aliphatic chain. Preferably, the number of carbon atoms in the aliphatic chain of the polyhydric alcohols is fewer than about 12.

As examples of the polyhydric alcohols may be mentioned those described supra in connection with component (1), i.e., dihydric alcohols, such as ethylene glycol, propylene glycol, butylene glycol, and the like; trihydric alcohols, such as glycerol; and higher aliphatic polyhydric alcohols, such as sorbitol.

As examples of the mono- and di-fatty acid esters of aliphatic polyhydric alcohols forming part of the addition agents disclosed herein, and preferred for use, may be mentioned the mono-fatty acid esters of glycerol, more commonly referred to as mono-glycerides, including compositions comprising mixtures of mono- and di-glycerides; propylene glycol monostearate; glyceryl lactopalmitate; glyceryl lactostearate; sorbitan mono-stearate; and polyoxyethylene (n) sorbitan monostearate; including mixtures of the foregoing. A particularly suitable mixture comprises 5 to 20 weight per cent polyoxyethylene 20 sorbitan monostearate and 80 to 95 weight per cent sorbitan monostearate.

The mono-glycerides, or mixtures of mono- and di-glycerides are prepared by procedures which are now well known, as for example, by careful alcoholysis of naturally occurring fats with glycerol.

Sorbitan monostearate, polyoxyethylene (n) sorbitan monostearate, and propylene glycol monostearate have been adquately described hereinabove.

Glyceryl lactopalmitate is the name given to the product obtained by the reaction of glycerol, higher fatty acids comprising at least about 50 per cent by weight palmitic acid, and lactic acid. The method of making glyceryl lactopalmitate is well known, and a particularly advantageous method is described in U.S. Pat. No. 2,690,971.

Glyceryl lactostearate is a product obtained by a similar reaction as stated above with the exception that stearic acid is substituted for palmitic acid.

As described in the referred to patent, glyceryl lactopalmitate may be prepared by reacting glycerol with about 1 equivalent mol per mol of glycerol of a mixture of myristic, palmitic and stearic acids containing at least 50 per cent by weight palmitic acid, and betweeen about 0.5 and 1 mol of lactic acid per mol of glycerol.

In carrying out the reaction, the mixed fatty acids, glycerol and lactic acid are heated to a temperature of about 185° C., in a vacuum with removal of water formed by the reaction; refluxing of lactic acid; and sparging with an inert gas, such as $CO_2$; and maintained at such conditions until the acid number of the reaction product is below about 8:1. The reaction product is then washed with water until substantially free of water-soluble material. The water washed reaction product comprises about 40–50 per cent of mixed lactic acid-fatty acid diglycerides; about 16–25 per cent monoglycerides; and the balance substantially all diglycerides of the fatty acids. The amount of triglyceride in the reaction product is quite low, and is usually less than about 1 per cent.

In the addition agents, the weight ratio of component (2) supra, to component (1), supra, may vary from about 0.01 to 100, and is usually between about 0.1 and 100. Preferably, and for best results, this weight ratio is between about 0.33 and 10.

As already described, the addition agents disclosed herein may be added as an ingredient to bakery goods either separately, or admixed with conventional ingredients.

Preferably, the addition agents are mixed with the shortening or water, and in this way introduced into the formulae for making the baked goods.

Regardless of whether the addition agents are incorporated as such or in admixture with other ingredients, the amount of the addition agent added to the bakery products may comprise between about 0.1 and 30 per cent by weight, based upon the shortening weight, and is preferably between about 0.3 and 10 per cent, based upon the shortening weight.

Shortenings with which the addition agents of the present invention may be combined are of the usual type, and in general are triglyceride oils or fats derived from animal sources such as lard or tallow and from plant sources such as the seed oils or corn, cotton, soy and the like. It is normal practice for those shortenings to be refined and processed to improve their properties. The usual treatments include catalytic hydrogenation to improve the plasticity, increase hardness and reduce the iodine number of the fatty material, and heat treatment in the presence of alkaline catalysts, with or without added glycerine, to improve the physical properties and functionality. For instance, the plastic super-glycerinated vegetable shortenings have been hydrogenated and subjected to inter-esterification reactions to improve the physical characteristics and increase the content of mono- and diglycerides and to increase the emulsification properties of the shortening. Shortenings of the usual type may also contain glycerine and/or natural or hydroxylated lecithin.

When the addition agents are to be combined with shortening and/or oil, this may be done by dissolving the agents in the usual type shortening, and then stirring and tempering the resulting mixture. Final treatment may also include the chilling and whipping treatments of the Votator process in the case of plastic shortenings.

As indicated above, the amount of the addition agent the baked leavened dough products may comprise between about 0.1 and 30 per cent, based upon the weight of the shortening. Shortening compositions containing the desired amount of addition agent may be prepared and added in lieu of the usual shortening. Obviously, however, mixtures of the usual shortenings and larger amounts of the addition agent can be produced, and this admixture can be used in lieu of only a portion of the usual shortening with the same net benefits resulting, and such compositions are to be considered part of this invention. Thus, shortenings containing anywhere from 0.1 to 99 weight per cent or more of the addition agents disclosed herein are within the purview of the instant invention.

The ingredients employed in making baked leavened products form no part of the present invention since any suitable formula may be used. The basic ingredients used in the manufacture of bread, for example, are flour, water, sodium chloride and yeast. For commercial bread, sugar, milk and shortening are conventionally added to these basic ingredients. For cake, or other sweet leavened products, eggs as well as other enriching agents may be added. Ordinarily, in making cake, chemical leavening agents, such as baking powder, rather than yeast, are employed.

The addition agents disclosed herein are especially suitable for use in cake formulae, and when added to such formulae provide stability and enhanced volume, symmetry, grain, texture and crumb color in the resultant baked product.

The cake mixes according to the invention can be prepared, for example, by thoroughly blending together the usual mix ingredients, such as flour, baking powder and sugar, with the addition agents disclosed herein. Preferably, the addition agents are added to the shortening, or to water to form a water dispersion, and in either of these forms are blended with the dry ingredients of such a mix before addition of the ordinary liquid ingredients, such as water, milk, eggs, flavorings, and the like.

It will be clear from the foregoing that the combination additives of this invention are surface active, i.e., they are capable of modifying surface tension at an oil-water interface. As such, they find utility in many industries where the modification of surface tension at an oil-water interface is desired. Since they are non-toxic, non-corrosive, and non-allergenic, the additives are especially useful in the food, pharmaceutical and cosmetic industry, where additives having such properties are of paramount importance.

The hydrates of the additives constitute preferred embodiments. These may be conveniently formed by combining the additives, or the components thereof, with water.

The invention in its broader aspects is not limited to the specific compositions, steps and methods described, but departures may be made therefrom within the scope of the accompanying claims without departing from the principles of the invention and without sacrificing its chief advantages.

What is claimed:

1. A cake mix comprising flour, baking powder and sugar intimately blended with a shortening composition which comprises triglyceride based fatty shortening material and from about 0.1 to 99 per cent by weight of the shortening of an addition agent which comprises:
   (1) a non-toxic alkyl ester of a dicarboxylic acid corresponding to the formula

R'OOCRCOOZ wherein R' is an alkyl substituent containing 12 to 24 carbon atoms; R is an alkyl group containing up to and including eight carbon atoms; and Z is a member selected from the group consisting of hydrogen, alkali metal, alkaline earth metal, aluminum and ammonium; and (2) a composition comprising a member selected from the group consisting of mono-fatty esters of aliphatic polyhydric alcohol compounds, di-fatty acid esters of aliphatic polyhydric alcohol compounds, fatty acid esters of lactic acid and mixtures of the foregoing, and acyl component of said member having 12 to 24 carbon atoms, the weight ratio of (2) to (1) being from 0.01 to 100.

2. The cake mix of claim 1 wherein composition (2) comprises a member selected from the group consisting of monofatty acid esters, di-fatty esters, and mixtures of mono- and di-fatty acid esters of glycerol.

3. The cake mix of claim 1 wherein composition (2) comprises an acyl lactylic acid compound corresponding to the general formula RCO (OCHCH$_3$CO)$_n$OZ wherein RCO is a member selected from the group consisting of acyl radicals of fatty acids containing 12 to 24 carbon atoms, and mixtures thereof, n is a number ranging from 0.1 to 10.0 which represents the average number of lactyl groups per molecule, and Z is a member selected from the group consisting of hydrogen, alkali metal, alkaline earth metal, aluminum and ammonium.

4. A chemically leavened cake product having incorporated therein a shortening containing about 0.1 to 99 percent by weight of a composition comprising:
   1. a non-toxic mono aliphatic ester of a dicarboxylic acid corresponding to the formula

R'OOCRCOOZ wherein R' is an aliphatic substituent containing 12 to 24 carbon atoms; R is an alkyl group containing up to and including eight carbon atoms; and Z is a member selected from the group consisting of hydrogen, alkali metal, alkaline earth metal, aluminum and ammonium; and
   2. fatty acid ester of lactic acid, wherein the acyl component of said fatty acid contains 12 to 24 carbon atoms, the weight ratio of (2) to (1) being from 0.01 to 100.

5. The composition of claim 4 wherein said dicarboxylic acid is a member selected from the group consisting of succinic, glutaric, adipic, fumaric, malic, azelaic and sebacic acids.

6. The composition of claim 4 wherein said fatty acid ester of monocarboxylic acid comprises acyl lactylic acid corresponding to the formula RCO (OCHCH$_3$CO)$_n$OZ wherein RCO is a member selected from the group consisting of acyl radicals of fatty acids containing 12 to 24 carbon atoms, and mixtures thereof, $n$ is a number ranging from 0.1 to 10.0 which represents the average number of lactyl groups per molecule, and Z is a member selected from the group consisting of hydrogen, alkali metal, alkaline earth metal, aluminum and ammonium and hydrates thereof.

7. The product of claim 4 wherein said chemically leavened product comprises cake.

8. A chemically leavened cake product having incorporated therein a shortening containing about 0.1 to 99 percent by weight of a composition comprising:

1. a mono aliphatic ester of a dicarboxylic acid selected from the group consisting of succinic, glutaric, adipic, fumaric, malic, azelaic and sebacic acids, wherein said mono aliphatic substituent contains 12 to 24 atoms, and wherein said dicarboxylic acid is selected from the group consisting of mono aliphatic acid ester, sodium, potassium, calcium and magnesium salts and hydrates thereof; and 2. an acyl lactylic acid corresponding to the formula $$RCO(OCHCH_3CO)_nOZ$$

wherein RCO is a member selected from the group consisting of acyl radicals of fatty acids containing 12 to 24 carbon atoms, and mixtures thereof, $n$ is a number ranging from 0.3 to 0.9 which represents the average number of lactyl groups per molecule and Z is a member selected from the group consisting of hydrogen, sodium, potassium, calcium and magnesium, the weight ratio of (2) to (1) being from 0.01 to 100.

* * * * *